United States Patent Office 2,724,723
Patented Nov. 22, 1955

2,724,723

PRODUCTION OF DIBASIC ACIDS

Louis H. Bock, Shelton, Wash., assignor to Rayonier Incorporated, Shelton, Wash., a corporation of Delaware No Drawing. Application June 2, 1952,
Serial No. 291,317

4 Claims. (Cl. 260—520)

This invention relates to organic compounds, especially to dibasic acids, and has for its object the provision of a method of producing the dibasic acids.

The dibasic acids produced according to the invention have the following chemical structure:

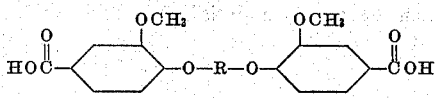

in which R is a divalent aliphatic group represented by the following examples:

—$CH_2$—$CH_2$—
—$CH_2$—$CH_2$—$CH_2$—
—$(CH_2)_n$— where $n$ is 2 to 6
—$CH_2CH_2OCH_2CH_2$—

In accordance with the method of the invention, these acids are all prepared from vanillin by the following series of reactions:

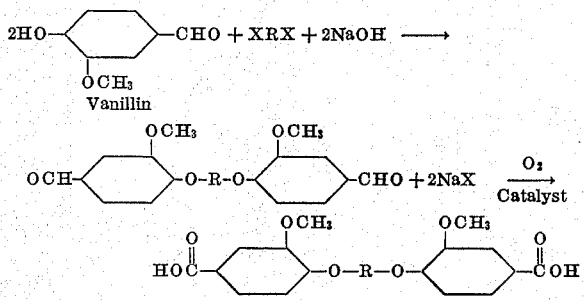

R in the above formulas is the same as described above. X is chlorine or bromine.

Vanillin, the starting material for the method of synthesis is potentially available in great abundance by the alkaline oxidation of sulfite waste liquor which is a byproduct in the manufacture of cellulose from wood. Thus, the products produced by the method of this invention may be made in quantity from raw materials which have, at present, no economic value and are, in fact, a menace to aquatic and marine life as they are usually dumped into rivers or bays.

The preparation of the dibasic acids according to the method of this invention is illustrated by the following example:

A mixture of 76 parts of vanillin, 21 parts of sodium hydroxide, 450 parts of water and 47 parts of ethylene dibromide was placed in a vessel equipped with a mechanical stirrer and reflux condenser. The mixture was stirred and heated to refluxing at a temperature of 100°–102° C. for 21 hours. A solid, cream-colored product was removed from the mother liquor by filtration. The product melted at 180°–184° C. and was ethane-1,2-bis-(2-methoxy-4-formylphenyl) ether. The yield was 67.9 parts or 82% of theory.

A mixture of 150 parts of ethane-1,2-bis-(2-methoxy-4-formylphenyl) ether prepared as described above and 0.7 part of the manganous salt of ethane-1,2-bis-(2-methoxy-4-carboxyphenyl) ether was placed in a tube with a gas inlet at the bottom. The mixture was heated at a temperature of 189–215° C. and oxygen was passed through for two hours. The mixture was then allowed to cool and was extracted with 1000 parts of 5% sodium hydroxide solution. Filtration of the resulting mixture gave 60 parts of insoluble material which was unchanged ethane-1,2-bis-(2-methoxy-4-formylphenyl) ether. The filtrate was acidified with hydrochloric acid. A precipitate formed which was filtered and dried. The product melted above 255° C. and was a dibasic acid of the general formula set out above. By the Geneva system of nomenclature it was ethane-1,2-bis(2-methoxy-3-carboxy phenyl) ether. The yield was 56 parts. The net yield based on starting material not recovered was 56.8% of theory.

Neither the temperature given in the above example for the reaction between the vanillin, sodium hydroxide and ethylene dibromide, nor the temperature to which the ethane-1,2-bis-(2-methoxy-4-formylphenyl) is heated in the presence of the manganous salt of ethane-1,2-bis-(2-methoxy-4-carboxyphenyl) while oxygen is being passed through it is critical. The former temperature may vary between about 75° C. and 140° C., while the latter may vary between about 180° C. and 250° C.

The compounds produced according to the invention may be used advantageously, for example, in the preparation of alkyd resins, and in the preparation of linear polyesters and linear polyamides employed in the manufacture of synthetic textile fibers.

For the preparation of a linear polyester for extrusion into a textile fiber, the preferred acid is the one in which the R group in the above formula is —$CH_2$—$CH_2$— as this acid has the highest melting point and the polyesters made from it have high melting points. For the preparation of linear polyamides and alkyd resins, the R group can be chosen to give the desired softening point and hardness to the resulting polymer. Thus, larger R groups give more flexible resins while the short R groups give harder resins.

My copending application Serial No. 198,048 filed November 28, 1950, now Patent No. 2,662,871, describes and claims linear polyesters obtained by the condensation of a dihydric alcohol with the dibasic compounds.

This application is a continuation-in-part of my application Serial No. 198,047, filed November 28, 1950, now Patent No. 2,630,454.

I claim:

1. The method of producing dibasic acids which comprises heating in aqueous solution, vanillin, sodium hydroxide and a compound having the formula XRX at a temperature between about 75° C. and 140° C. for a length of time sufficient to form a compound having the formula

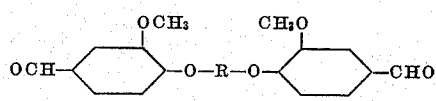

and oxidizing the last-named compound to form a dibasic acid having the formula

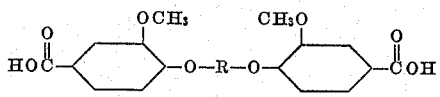

wherein each of said formulae R is a member selected from the group consisting of —$CH_2$—$CH_2$—,

—$CH_2$—$CH_2$—$CH_2$—

—$(CH_2)_n$— where $n$ is 2 to 6, and

—$CH_2CH_2OCH_2CH_2$— and X is a halogen of the group consisting of chlorine and bromine.

2. The method of producing dibasic acids which comprises heating in aqueous solution, vanillin, sodium hydroxide, and a compound having the formula XRX at a temperature between about 75° C. and 140° C. for a length of time sufficient to form a compound having the formula

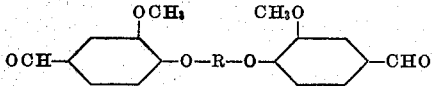

and passing an oxygen-containing gas through the last-named compound while it is maintained at a temperature between about 180° C. and 250° C. in the presence of an oxidation catalyst to form a dibasic acid having the formula

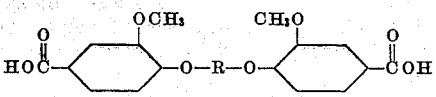

wherein each of said formulae R is a member selected from the group consisting of —$CH_2$—$CH_2$—, —$CH_2$—$CH_2$—$CH_2$—,
—$(CH_2)_n$— where $n$ is 2 to 6, and
—$CH_2CH_2OCH_2CH_2$—, and X is a halogen of the group consisting of chlorine and bromine.

3. The method of producing dibasic acids defined in claim 2 in which the oxidation catalyst is the manganous salt of ethane-1,2-bis-(2-methoxy-4-carboxyphenyl) ether.

4. The method of producing dibasic acids defined in claim 2 in which the dibasic acid formed by the oxidation is precipitated by the addition of a non-oxidizing mineral acid.

References Cited in the file of this patent
UNITED STATES PATENTS

| | | |
|---|---|---|
| 2,446,606 | Pearl | Aug. 10, 1948 |
| 2,630,454 | Bock | Mar. 3, 1953 |

FOREIGN PATENTS

| | | |
|---|---|---|
| 214,153 | Germany | Oct. 5, 1909 |

OTHER REFERENCES

Gatterman: Liebig's Ann., vol. 357, pp. 348–351 (1907).

Cahours: Beilstein (Handbuch, 4th ed.) vol. 10, p. 395 (1927).

Berkman et al.; "Catalysis" Reinhold Publ. Corp. (1940) pgs. 792–794.